Dec. 10, 1963  H. M. PRYALE  3,113,769
TORSION MOUNTING

Filed May 8, 1961  3 Sheets-Sheet 1

INVENTOR.
HARRY M. PRYALE
BY
Whittemore Hulbert
& Belknap
ATTORNEYS

Dec. 10, 1963　　　H. M. PRYALE　　　3,113,769
TORSION MOUNTING
Filed May 8, 1961　　　　　　　　　　　　3 Sheets-Sheet 2

INVENTOR.
HARRY M. PRYALE
BY
Whittemore, Hulbert
& Belknap
ATTORNEYS

Dec. 10, 1963 H. M. PRYALE 3,113,769
TORSION MOUNTING
Filed May 8, 1961 3 Sheets-Sheet 3

INVENTOR.
HARRY M. PRYALE
BY Whittemore, Hulbert
& Belknap
ATTORNEYS

United States Patent Office 3,113,769
Patented Dec. 10, 1963

3,113,769
TORSION MOUNTING
Harry M. Pryale, Bloomfield Township, Oakland County, Mich., assignor, by mesne assignments, to Baldwin-Montrose Chemical Company Incorporated (Baldwin Division), Pontiac, Mich., a corporation of Indiana
Filed May 8, 1961, Ser. No. 108,384
17 Claims. (Cl. 267—57.1)

This invention relates to a load supporting mounting. More particularly, this invention relates to a load supporting resilient mounting which includes a yieldable body which is subject to various types of loading including shear and torsion.

The invention is characterized by the arrangement of a yieldable body in a vehicle for determining the ride characteristics of the vehicle wherein the yieldable body is subject to torsion to support the load when the vehicle is empty or lightly loaded and is subjected to shear including compression and/or tension to support the vehicle for heavier loads.

It is an object of the present invention to provide a load supporting mounting comprising a yieldable body constructed in a manner to provide the required rate of deflection under varying loads and which is also effective to absorb shocks throughout the full range of deflection.

It is another object of the present invention to provide a mounting comprising a yieldable body which is adapted for a plurality of different types of loading including shear and torsion.

Another object of the present invention is to provide a resilient mounting comprising a pair of concentrically arranged rigid sleeve members, a ring member formed of a resilient yieldable material disposed between and bonded to said rigid sleeve members, and means connected to one of the rigid sleeve members and operable under load for axially displacing and rotating said one rigid sleeve member relative to the other sleeve member and which is effective to subject said resilient ring member to shear, compression and torsion stresses simultaneously.

A further object of the present invention is to provide a resilient mounting of the type just described which includes a connector having a helically splined connection with the inner rigid sleeve member and operable under load for axially displacing and rotating the inner rigid sleeve member relative to the outer rigid sleeve member and which is effective to subject the resilient ring member to shear, compression and torsion stresses simultaneously.

A still further object of the present invention is to provide a resilient mounting of the type just described wherein the upper ends of the rigid sleeve members are disposed in a downwardly stepped arrangement from the inner rigid sleeve member to the outer rigid sleeve member.

Another object of the present invention is to provide a resilient mounting comprising three concentrically arranged rigid sleeve members, ring members formed of resilient yieldable material disposed between and bonded to the adjacent rigid sleeve members, and means connected to the inner sleeve member for axially displacing and rotating the inner sleeve member relative to the intermediate sleeve member and which is effective to subject the resilient ring member therebetween to shear stresses, torsion stresses and compression simultaneously.

Another object of the present invention is to increase the load carrying capacity of the resilient mounting just described by providing a doughnut-shaped member of yieldable material immediately below the resilient ring members, the height of the doughnut-shaped member depending on the desired load-deflection curve.

Still another object of the present invention is to provide load supporting mountings of the types previously described in combination with a pair of spaced supports which are relatively movable in directions toward and away from each other.

A further object of the present invention is to provide a resilient torsion mounting which is simple in consrtuction, economical to manufacture, durable in operation, and which is easy to maintain.

Other objects and features of the invention will become apparent as the description proceeds, especially when taken in conjunction with the accompanying drawings, illustrating preferred embodiments of the invention, wherein.

Although the mounting forming the subject matter of this invention may be used in many cases where it is desired to resiliently support a load, nevertheless the nature of the mounting renders its use practical in load carrying vehicles for supporting the sprung assembly from the unsprung unit. In fact, tests have shown that yieldable bodies embodying the features of this invention are superior in many respects to the expensive and cumbersome semi-elliptical steel springs which have been used in the past for the purpose of supporting the sprung assembly of the vehicle and are an improvement over other types of resilient mountings which subject the rubber-like material therein to only shear and compressive stresses.

As will be presently described in detail, the yieldable body of the resilient mounting is constructed in a manner such that it affords proper stability and a suitable rate of deflection during periods where no load or where a very light load is supported and at the same time provides a sufficient rate of deflection at full or approximately full loads to assure highly satisfactory riding characteristics.

For the purposes of illustration, the invention is defined herein as used in connection with load carrying vehicles, although it will be understood as this description proceeds that the mounting may be used in practically all cases where it is desirable to resiliently support a load.

Figure 1:
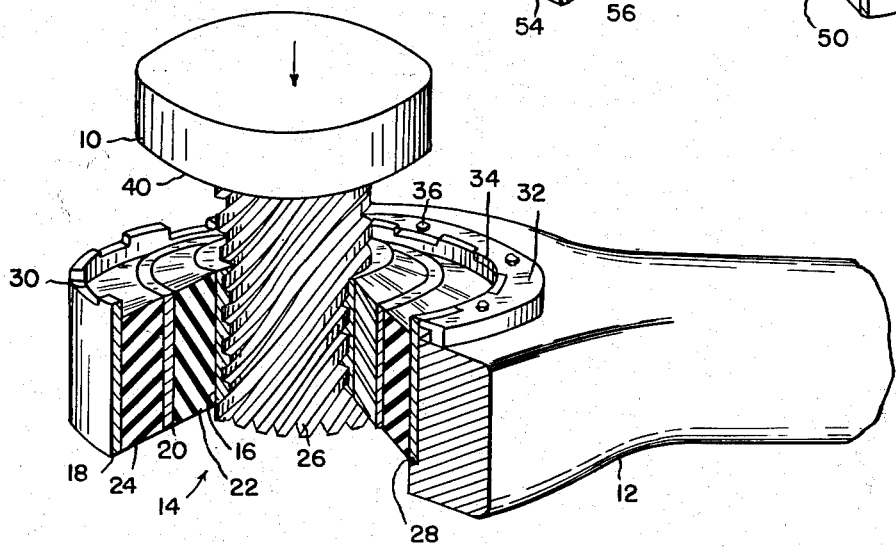
FIGURE 1 is a pictorial view, partly in section, of a resilient mounting embodying the features of this invention and mounted between a pair of relatively movable spaced supports.

With the above in view, reference is made more in detail to FIGURE 1 of the drawings where it will be noted that the numeral 10 designates the sprung assembly of a vehicle and the numeral 12 indicates the unsprung assembly of the vehicle. The sprung assembly 10 is supported on the unsprung assembly 12 by means of a load supporting resilient mounting 14 interposed between said assemblies and including yieldable material formed of rubber or some material having characteristics similar to rubber. In most applications, it is preferred to utilize yieldable material such as a synthetic rubber compound capable of withstanding exceptionally heavy loads for indefinite periods without losing its resiliency and also capable of withstanding oil and grease without deteriorating. Satisfactory results may be obtained by using suitably compounded synthetic rubber or a combination of natural rubber and a synthetic rubber.

The resilient mounting 14 comprises a plurality of concentrically mounted rigid sleeve members including an inner sleeve member 16, an outer sleeve member 18 and an intermediate sleeve member 20. The outer sleeve member 18 is adapted to be connected to the unsprung assembly 12 in a manner to be subsequently described. The inner sleeve member 16 is adapted to be connected to the sprung assembly 10.

Figure 4:
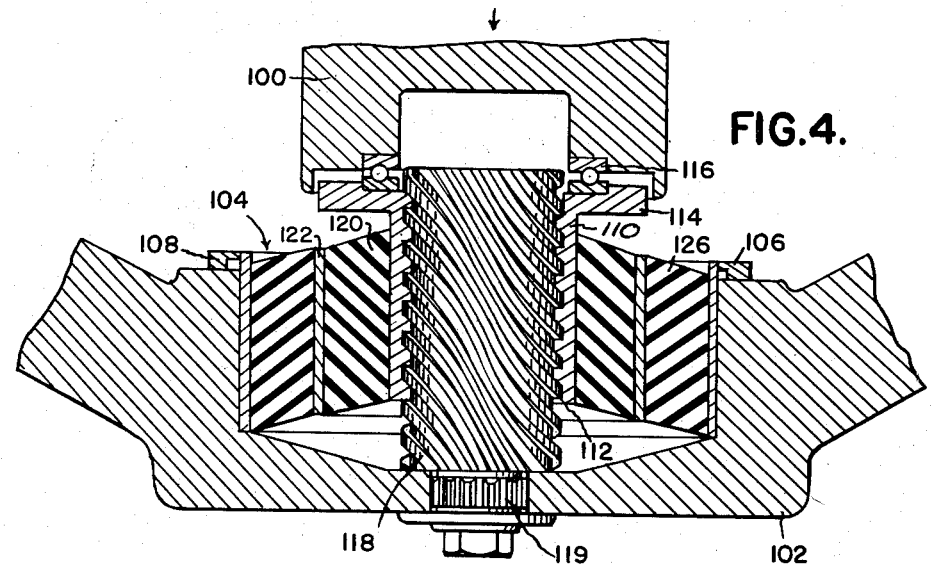
FIGURE 4 is a semi-diagrammatic sectional elevational view through a resilient suspension embodying the features of this invention.
Figure 5:
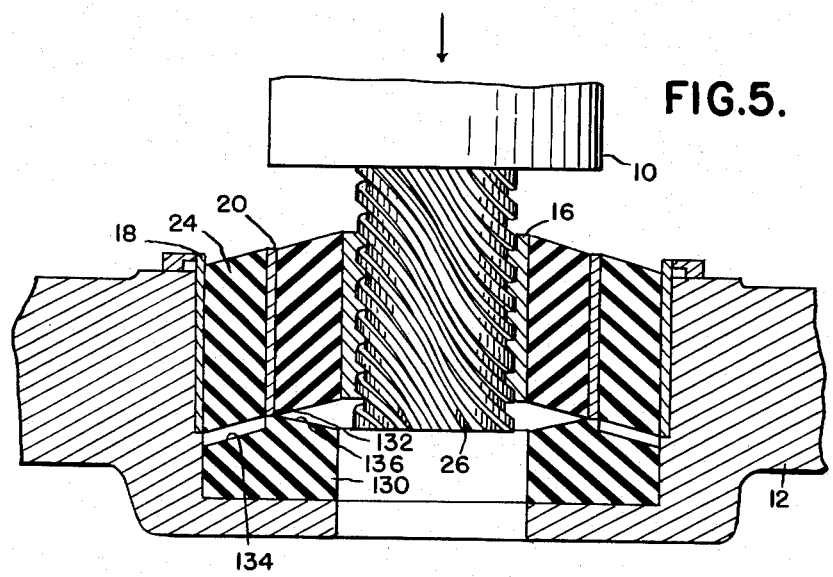
FIGURE 5 is a sectional diagrammatic view through a resilient suspension embodying still another embodiment of the present invention.

The upper ends of the rigid sleeve members are disposed in a downwardly stepped arrangement from the inner rigid sleeve member 16 to the outer rigid sleeve member 18 as is best illustrated in FIGURES 4 and 5. The mounting 14 includes between the rigid sleeve members 16 and 20 a ring member 22 of yieldable material such as rubber as previously described which is disposed between and bonded to the opposite surfaces of the sleeve members 16 and 20. A second ring member 24 of similar yieldable material is disposed between and bonded to the sleeve members 18 and 20. The upper and lower ends of the ring members 22 and 24 are disposed in a downwardly stepped arrangement in a manner similar to the step arrangement provided between the rigid sleeve members.

The sprung assembly 10 has a helically splined pin, member, element, or connector 26 which extends downwardly therefrom so as to engage the splines provided on the inner periphery of the sleeve member 16. As an example, the spline may take the form of a 22-degree or a 35-degree pitch.

The outer rigid sleeve member 18 is received in a socket 28 of the unsprung assembly 12 and is provided circumferentially around the upper end thereof with radially extending tabs and grooves 30. A fastening ring 32 includes a plurality of ears 34 which are received in the grooves 30. The fastening ring 32 is secured to the unsprung assembly 12 by means of a plurality of bolts 36 so as to maintain the outer rigid sleeve member 18 in the socket 28.

In the past, when a shear spring or mounting was utilized, it was impossible to obtain suitable riding characteristics when the vehicle was empty or lightly loaded since there was only a very small amount of movement between the assemblies. At such times, the shear spring or mounting performed more like a solid rigid block rather than a resilient mount. The present invention overcomes this problem by subjecting the inner resilient yieldable ring member to torsion when the vehicle is empty or lightly loaded so as to obtain increased movement between the sprung and unsprung assemblies. This results in a substantial improvement in the riding characteristics when the vehicle is empty or lightly loaded.

In operation, when the vehicle is empty or lightly loaded, relative movement takes place between the helically splined connector 26 and the unsprung assembly 12. This results in the torquing, twisting or turning of the helically splined inner rigid sleeve member 16 with respect to the outer sleeve member 18, thereby subjecting the rubber or yieldable ring member 22 to torsion. This action generally takes place prior to the deflection of the inner rigid sleeve member 16 with respect to the other rigid sleeve members although a small deflection does take place due to the axial forces created during movement of the assemblies due to the spline connection.

As the load on the vehicle increases, an abutment surface 40 on the bottom of the sprung assembly 10 strikes the inner rigid sleeve member 16, thereby axially deflecting it relative to the intermediate rigid sleeve member 20. As a result, the inner ring member 22 is subjected to compressive and shear stresses to support the heavier loads in addition to the torsion effects.

The deflection of the rigid sleeve member 16 continues upon further increases in load until the abutment surface 40 of the sprung assembly 10 strikes the top of the intermediate rigid sleeve member 20. Continued loading of the vehicle moves the rigid sleeve members 16 and 20 relative to the outer sleeve member 18, thereby placing the yieldable ring member 24 in compression and shear. This supplements the load supporting characteristics of the inner ring member 22. The shear is applied to the ring members 22 and 24 in a direction substantially perpendicular to the torsion forces applied as a result of the vertical loading.

With such a construction, the ring members 22 and 24 are progressively effective beginning with the inner ring member 22, which first acts in torsion, to resiliently support the vehicle at no loads or relatively light loads and which further support the vehicle when the load on the vehicle increases. With further increases in loads, the inner and intermediate sleeve members 16 and 20 move relative to the outer sleeve member 18 in such a manner that the upper edges of the inner and intermediate rigid sleeve members move to a position below the upper edges of the outer rigid sleeve members upon the application of a maximum load to the vehicle. At such time, the rigid sleeve members 16 and 20 will have been moved to a position where the sleeve members are stepped downwardly starting at the outer rigid sleeve member 18 toward the intermediate rigid sleeve member 20.

Figure 2:
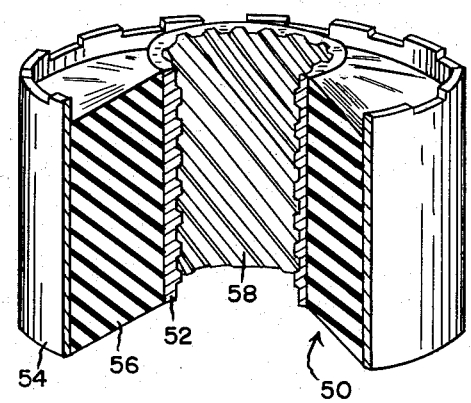
FIGURE 2 is a pictorial view, partly in section, illustrating another embodiment of the present invention.

FIGURE 2 illustrates another embodiment of the present invention. The load supporting resilient mounting is designated by the numeral 50 and is distinguished from the embodiment shown in FIGURE 1 in that only a pair of concentrically arranged rigid sleeve members 52 and 54 is provided. An intermediate ring member 56 formed of yieldable material is disposed between and bonded to the surfaces of the rigid sleeve members 52 and 54. The inner periphery of the inner ring member 52 is provided with a helical spline 58. The rigid sleeve members 52 and 54 are stepped downwardly as in the other embodiment. The mounting 50 functions in the same manner as the embodiment shown in FIGURE 1 with the resilient ring member 56 being subjected to torsion and shear, and compression.

Figure 3:
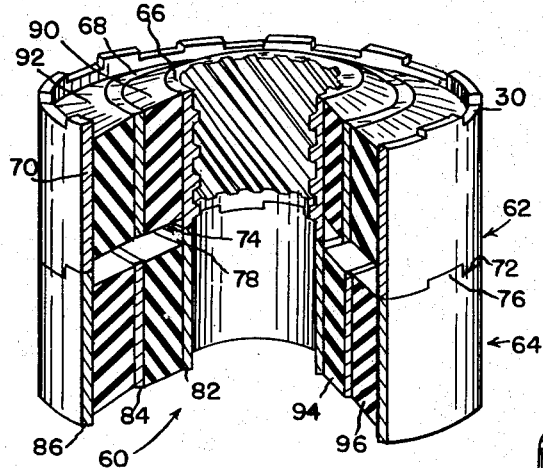
FIGURE 3 is a pictorial view, partly in section, illustrating still another embodiment of the present invention.

FIGURE 3 illustrates another modification of the invention wherein a load supporting mounting 60 is provided which has a pair of resilient mountings 62 and 64, each being similar to the one illustrated in FIGURE 1, concentrically mounted and arranged to act in unison. The upper mounting 62 has the lower edges of the inner and outer rigid sleeve members 66 and 70 provided with alternate tabs and slots 72 and 74 respectively so as to interlock with the tabs and slots 76 and 78 provided on the upper edges of the inner and outer sleeve members 82 and 86 respectively of the lower load supporting mounting 64.

With such a construction, the lower edges of the inner and outer rigid sleeve members 66 and 70 of the upper mounting 62 are interlocked with the corresponding members of the lower mounting 64 so as to act as a unit.

In FIGURE 3, only the upper inner rigid sleeve member 66 is provided with a helical spline although it should be understood that both the upper and lower inner sleeve members 66 and 82 may be provided with a helical spline. The mounting 60 is located and secured in a socket of the unsprung assembly 12 as in the manner illustrated in FIGURE 1.

The torquing or twisting of the inner rigid sleeve member 66 also twists the lower inner rigid sleeve member 82 so as to subject both inner resilient ring members 90 and 94 to torsion simultaneously.

In the embodiment illustrated in FIGURE 4, the sprung assembly is represented by the numeral 100 and the unsprung assembly by the numeral 102. The load supporting mounting 104 has three concentrically arranged rigid sleeve members. The outer rigid sleeve member 106 is secured to the assembly 102 by means of a fastening ring 108 in a manner similar to the embodiment illustrated in FIGURE 1. The inner rigid sleeve member 110 has an internally splined surface 112. The rigid sleeve member 110 is longer in length relative to the other rigid sleeve members than in the embodiment illustrated in FIGURE 1. The inner rigid sleeve member 110 is provided with a bearing support portion 114 which has a bearing 116 thereon and on which the assembly 100 is mounted. The spline connector 118 has a reduced gear portion 119 mounted in the assembly 102. This embodiment differs from the other embodiments in that the inner sleeve member 110 is movable directly with the assembly 100 and the spline connector 118 is adapted to move with the assembly 102.

In operation, when the vehicle is empty or lightly loaded, relative movement takes place between the assemblies 100 and 102. This results in the torquing, twisting or turning of the helically splined inner rigid sleeve member 110 with respect to the outer rigid sleeve member 106, thereby subjecting the inner yieldable ring member 120 to torsion. As the load on the vehicle increases, the inner rigid sleeve member 110 deflects axially relative to the intermediate rigid sleeve member 122. As a result, the inner rigid sleeve member 110 is subjected to compressive and shear stresses to support the heavier loads in addition to the effects of the torsion.

The deflection of the inner rigid sleeve member 110 continues upon further increases in load until a point is reached where the intermediate rigid sleeve member 122 starts to deflect. Continued loading of the vehicle moves the rigid sleeve members 110 and 122 relative to the outer rigid sleeve member 106, thereby placing the outer yieldable ring member 126 in compression and shear.

FIGURE 5 is an embodiment similar to FIGURE 1 with the exception that a resilient yieldable doughnut-shaped insert 130 has been provided in the socket of the assembly 12. Where applicable, the same numerical designations will be used. The doughnut-shaped insert 130 has an intermediate upwardly facing flat abutment surface 132 which is of a width equal to the width of the intermediate sleeve member 20. In addition, the upper edge of the insert 130 is provided with a downwardly stepped, downwardly tapering surface portion 134 which is spaced from and parallel to the lower edge of the yieldable ring member 24. In addition, the insert 130 is provided with a downwardly tapering surface portion 136 so as to provide a space between said surface portion 136 and the lower surface of the ring member 22.

The purpose of the doughnut-shaped insert 130 is to provide additional load supporting characteristics for the vehicle as will be explained in more detail later on when reference is made to the graphs illustrated in FIGURE 7.

Figure 6:
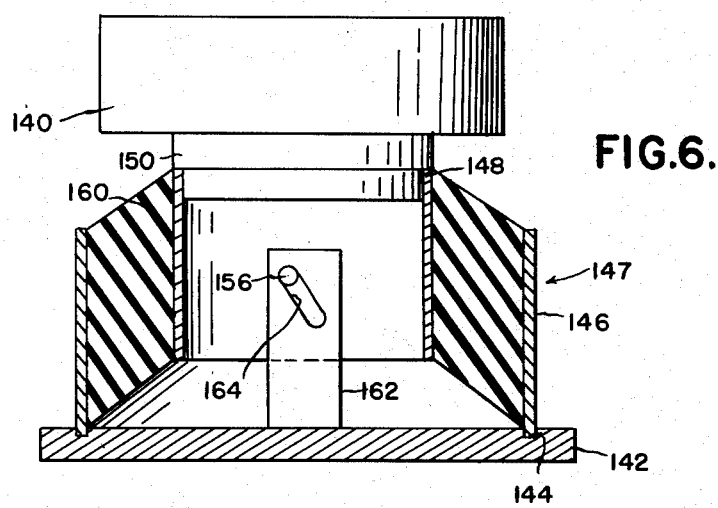
FIGURE 6 is a front elevation of still another embodiment of the present invention.

FIGURE 6 illustrates another modification of the present invention. Instead of using a helically splined connection as shown in FIGURES 1, 4 and 5, a pin and slot arrangement is utilized to provide the requisite torquing of the inner yieldable ring member.

The sprung and unsprung assemblies are represented by the numerals 140 and 142 respectively. A circumferentially extending recess 144 is provided in the assembly 142 for receiving the lower edge of the outer rigid sleeve member 146 which forms part of the load supporting mounting 147. The sleeve member 146 is firmly secured to the unsprung assembly 142 as in the other embodiments. The inner rigid sleeve member 148 is appropriately secured to a cylindrical member 150. The sleeve member 148 is provided with a radially extending pin 156. A resilient yieldable ring member 160 is disposed between and bonded to the concentrically arranged sleeve members 146 and 148 in a step-down relationship. A bracket 162 is secured to the assembly 142 and is provided with an inclined slot 164 in which the pin 156 is received.

When the vehicle is empty or lightly loaded, relative movement takes place between the sprung and unsprung assemblies so that the pin 156 rides in the slot 164, thereby torquing, twisting or turning the inner rigid sleeve member 148 with respect to the outer rigid sleeve member 146. This torquing subjects the yieldable ring member 160 to torsion.

Figure 7:
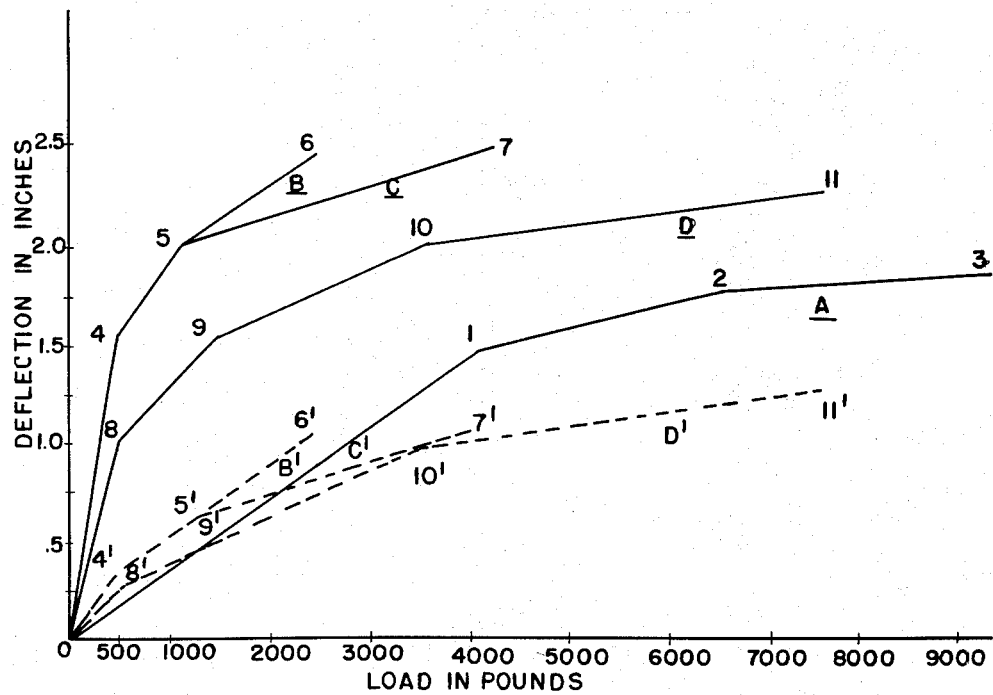
FIGURE 7 illustrates a graph showing various deflection-load curves of a mounting embodying the features of this invention.

In FIGURE 7 of the drawings, there is illustrated a plurality of load-deflection curves A—D and B'—D'. Curves A—D are in solid lines and represent the movement between a pair of movable elements, members or assemblies such as the sprung and unsprung assemblies of a vehicle. Curves A and B'—D' which are dotted represent the deflection of the load supporting resilient mounting utilizing three concentrically arranged rigid sleeve members. Tests, illustrated by the graphs, were conducted with a 22-degree twist load.

The load supporting resilient mounting was mounted between a pair of movable members. Initially, no torque was applied to the mounting. Curve A resulted which represents the deflection of the mounting and the movement between the assemblies in accordance with load. The line of curve A containing points 0 and 1 and the line containing the points 1 and 2 represent the deflection curve of the inner rigid sleeve member and the intermediate sleeve member respectively. The line containing points 2 and 3 represents a decrease in the slope of the curve due to the use of the doughnut-shaped insert below the intermediate sleeve member.

When torquing the mounting as shown in FIGURE 1, curves B and B' resulted. Curve B illustrates the movement of the assemblies between points 0 and 4 due primarily to torsion.

The lines on curve B determined by points 4 and 5 and points 5 and 6 respectively represent the movement between the assemblies due to the deflection of the inner rigid sleeve member and the intermediate sleeve member respectively.

Curve B' indicates that during torsion the mounting itself deflects slightly between points 0 and 4'. Curve B clearly indicates that for relatively small loads a substantial movement between the assemblies is permitted to greatly improve the riding characteristics of the vehicle. This is the result of torquing the mounting.

When the doughnut-shaped insert is combined with the torsion mounting as in FIGURE 5, curves C and C' result. Curves C and C' each have a portion which coincides with curves B and B' respectively. Curve C illustrates that after twist has occurred between points 0 and 4 and the inner sleeve member deflected between points 4 and 5, the intermediate sleeve member and doughnut-shaped insert combine to decrease the rate of movement between the assemblies as determined by the slope of the line containing points 5 and 7. Similarly, the slope of the curve C' containing points 5' and 7' also decreases.

Curves B and C illustrate that the twist occurs between 0 and 1.5 inch. If it is desired to limit the range of twist to, for example, one inch, then curve D results. The torsion occurs between points 0 and 8. The inner sleeve member deflects between points 8 and 9 and the intermediate sleeve member deflects between points 9 and 10. The doughnut-shaped insert combines to decrease the slope of the curve D as shown by the line between points 10 and 11. Curve D' represents the deflection of the mounting itself and clearly indicates that the doughnut-shaped insert decreases the slope of the line containing points 9' and 10'.

By comparing the above curves, it will be noted that the mounting embodying the features of the present invention has a very superior deflection characteristic through a wide range of loads and particularly during initial loads to provide the requisite riding characteristics of the vehicle when empty or lightly loaded and still maintain the high load carrying ability.

The rigid sleeve members may be made from butt welded steel tubing or from extruded solid wall tubing. It is also within the contemplation of this invention that the helical spline provided on the periphery of the inner rigid sleeve member be provided on a separate member which is pressed into the inner rigid sleeve member. The durometer of the rubber in conjunction with the angle and length of twist will help in determining the desired load-deflection curves.

It should be understood that appropriate means, not shown, such as a retaining nut or the like, is provided with the structures illustrated in FIGURES 1 and 5 to prevent the helically splined pin 26 from being pulled out of or separated from the inner rigid sleeve member 16.

Throughout the specification, the term "shear" has been utilized. However, it is realized that the yieldable ring members support the load primarily in shear but, in addition, in compression and tension.

The drawings and the foregoing specification constitute a description of the improved torsion mounting in such full, clear, concise and exact terms as to enable any person skilled in the art to practice the invention, the scope of which is indicated by the appended claims.

What I claim as my invention is:

1. A resilient mounting comprising a pair of concentrically arranged, rigid sleeve members, a ring member formed of a resilient yieldable material disposed between and bonded to said rigid sleeve members, means for supporting one of said rigid sleeve members in a stationary position, and means connected to the other of said rigid sleeve members and operable under load for axially displacing and rotating said other rigid sleeve member relative to said one sleeve member and which is effective to subject said resilient ring member to shear stresses and torsion stresses simultaneously.

2. A resilient mounting comprising a pair of concentrically arranged, rigid sleeve members, a ring member formed of a resilient rubber-like material disposed between and bonded to said rigid sleeve members, means for supporting one of said rigid sleeve members in a stationary position, and means connected to the other of said rigid sleeve members and operable under load for axially displacing and rotating said other rigid sleeve member relative to said one sleeve member and which is effective to subject said resilient ring member to shear stresses and torsion stresses simultaneously.

3. A resilient mounting comprising a pair of concentrically arranged, rigid sleeve members, a ring member formed of a resilient yieldable material disposed between and bonded to said rigid sleeve members, means for supporting the outer sleeve member in a stationary position, and a connector having a helically splined connection with the inner rigid sleeve member and operable under load for axially displacing and rotating said inner rigid sleeve member relative to the outer rigid sleeve member and which is effective to subject said resilient ring member to shear stresses and torsion stresses simultaneously.

4. A resilient mounting comprising a pair of concentrically arranged, rigid sleeve members, a ring member formed of a resilient rubber-like material disposed between and bonded to said rigid sleeve members, means for supporting the outer sleeve member in a stationary position, and a connector having a helically splined connection with the inner rigid sleeve member and operable under load for axially displacing and rotating said inner rigid sleeve member relative to the outer rigid sleeve member and which is effective to subject said resilient ring member to shear stresses and torsion stresses simultaneously.

5. A resilient mounting comprising a pair of concentrically arranged, rigid sleeve members, a ring member formed of a resilient rubber-like material disposed between and bonded to said rigid sleeve members in such a manner that the upper ends of the rigid sleeve members are disposed in a downwardly stepped arrangement from the inner rigid sleeve member to the outer rigid sleeve member, means for supporting the outer sleeve member in a stationary position, and a connector having a helically splined connection with the inner rigid sleeve member and operable under load for axially displacing and rotating said inner rigid sleeve member relative to the outer rigid sleeve member and which is effective to subject said resilient ring member to shear stresses and torsion stresses simultaneously.

6. A resilient mounting comprising three concentrically arranged rigid sleeve members, ring members formed of resilient yieldable material disposed between and bonded to the adjacent rigid sleeve members, means for supporting the outer sleeve member in a stationary position, and means connected to said inner sleeve member for axially displacing and rotating said inner sleeve member relative to the intermediate sleeve member and which is effective to subject the resilient ring member therebetween to shear stresses and torsion stresses simultaneously.

7. A resilient mounting comprising three concentrically arranged rigid sleeve members, ring members formed of resilient yieldable material disposed between and bonded to the adjacent rigid sleeve members in such a manner that the upper ends of the rigid sleeve members are disposed in a downwardly stepped arrangement from the inner sleeve member to the outer sleeve member, means for supporting the outer sleeve member in a stationary position, and means connected to said inner sleeve member for axially displacing and rotating said inner sleeve member relative to the intermediate sleeve member and which is effective to subject the resilient ring member therebetween to shear stresses and torsion stresses simultaneously.

8. A resilient mounting comprising three concentrically arranged rigid sleeve members, ring members formed of resilient yieldable material disposed between and bonded to the adjacent rigid sleeve members in such a manner that the upper ends of the rigid sleeve members are disposed in a downwardly stepped arrangement from the inner sleeve member to the outer sleeve member, means for supporting the outer sleeve member in a stationary position, and a connector having a helically splined connection with the inner rigid sleeve member and operable under load for axially displacing and rotating said inner sleeve member relative to the intermediate sleeve member and which is effective to subject the resilient ring member therebetween to shear stresses and torsion stresses simultaneously.

9. A resilient mounting comprising three concentrically arranged rigid sleeve members, ring members formed of resilient rubber-like material disposed between and bonded to the adjacent rigid sleeve members in such a manner that the upper ends of the rigid sleeve members are disposed in a downwardly stepped arrangement from the inner sleeve member to the outer sleeve member, means for supporting the outer sleeve member in a stationary position, and a connector having a helically splined connection with the inner rigid sleeve member and operable under load for axially displacing and rotating said inner sleeve member relative to the intermediate sleeve member and which is effective to subject the resilient ring member therebetween to shear stresses and torsion stresses simultaneously.

10. In combination with a pair of spaced supports relatively movable in directions toward and away from each other, a load supporting mounting comprising a pair of concentrically arranged rigid sleeve members, a resilient ring member formed of yieldable material disposed between and bonded to each of said sleeve members, fastening means connecting one of said sleeve members to one of said supports, and means connecting the other sleeve member to the other of said supports and operable for axially displacing and rotating said other sleeve member relative to said one sleeve member upon movement between said supports and which is effective to subject the resilient ring member to shear stresses and torsion stresses simultaneously.

11. In combination with a pair of spaced supports relatively movable in directions toward and away from each other, a load supporting mounting comprising a pair of concentrically arranged rigid sleeve members, a resilient ring member formed of yieldable material disposed between and bonded to each of said sleeve members, fastening means connecting the outer sleeve member to one of said supports, and a connector connected to the other of said supports and having a helically splined connection with the inner sleeve member, said connector being operable upon relative movement between said supports to axially displace and rotate said inner sleeve member with respect to said outer sleeve member and effective to subject the resilient ring member to shear stresses and torsion stresses simultaneously.

12. In combination with a pair of spaced supports relatively movable in directions toward and away from each other, a load supporting mounting comprising three concentrically arranged rigid sleeve members, ring members formed of resilient yieldable material disposed between and bonded to adjacent rigid sleeve members, fastening means connecting the outer sleeve member to one of said supports, and a helically splined connector between the other of said supports and the inner sleeve member and operable upon loading of said supports for axially displacing and rotating said inner sleeve member relative to the intermediate sleeve member and which is effective to subject the resilient ring member therebetween to shear stresses and torsion stresses simultaneously.

13. In combination with a pair of spaced supports relatively movable in directions toward and away from each other, a load supporting mounting comprising three concentrically arranged rigid sleeve members, ring members formed of resilient yieldable material disposed between and bonded to adjacent rigid sleeve members in such a manner that the upper ends of the rigid sleeve members are disposed in a downwardly stepped arrangement from the inner sleeve member to the outer sleeve member, fastening means connecting the outer sleeve member to one of said supports, and a helically splined connector between the other of said supports and the inner sleeve member and operable upon loading of said supports for axially displacing and rotating said inner sleeve member relative to the intermediate sleeve member and which is effective to subject the resilient ring member therebetween to shear stresses and torsion stresses simultaneously.

14. A resilient mounting comprising three concentrically arranged rigid sleeve members, inner and outer ring members formed of resilient yieldable material disposed between and bonded to the adjacent rigid sleeve members in such a manner that the upper ends of the rigid sleeve members are disposed in a downwardly stepped arrangement from the inner sleeve member to the outer sleeve member, means for supporting the outer sleeve member in a stationary position, a doughnut-shaped insert formed of resilient yieldable material located below said ring members, said insert including a portion in engagement with the bottom edge of said intermediate sleeve member, and means operable under load for torquing and axially displacing said inner sleeve member relative to the outer sleeve member, thereby subjecting the inner resilient ring member to shear stresses and torsion stresses simultaneously, said insert modifying the resilient load supporting characteristics of the outer ring member due to the axial displacement of the intermediate sleeve member upon increases in load.

15. A resilient mounting comprising three concentrically arranged rigid sleeve members, inner and outer ring members formed of resilient yieldable material disposed between and bonded to the adjacent rigid sleeve members in such a manner that the upper ends of the rigid sleeve members are disposed in a downwardly stepped arrangement from the inner sleeve member to the outer sleeve member, means for supporting the outer sleeve member in a stationary position, a doughnut-shaped insert formed of resilient yieldable material located below said ring members, said insert including a portion in engagement with the bottom edge of said intermediate sleeve member, and a connector having a helically splined connection with the inner rigid sleeve member and operable under load for torquing and axially displacing said inner sleeve member relative to the outer sleeve member, thereby subjecting the inner resilient ring member to shear stresses and torsion stresses simultaneously, said insert modifying the resilient load supporting characteristics of the outer ring member due to the axial displacement of the intermediate sleeve member upon increases in load.

16. A resilient mounting comprising a pair of concentrically arranged, rigid sleeve members, a ring member formed of a resilient yieldable material disposed between and bonded to said rigid sleeve members, means for supporting the outer sleeve member in a stationary position, and means including a pin and slot connection operatively connected to the inner rigid sleeve member and operable under load for axially displacing and rotating said inner rigid sleeve member relative to the outer rigid sleeve member and which is effective to subject said resilient ring member to shear stresses and torsion stresses simultaneously.

17. A resilient mounting comprising a pair of concentrically arranged, rigid sleeve members, a ring member formed of a resilient rubber-like material disposed between and bonded to said rigid sleeve members in such a manner that the upper ends of the rigid sleeve members are disposed in a downwardly stepped arrangement from the inner rigid sleeve member to the outer rigid sleeve member, and means including a pin and slot connection operatively connected to the inner rigid sleeve member and operable under load for axially displacing and rotating said inner rigid sleeve member relative to the outer rigid sleeve member and which is effective to subject said resilient ring member to shear stresses and torsion stresses simultaneously.

References Cited in the file of this patent

UNITED STATES PATENTS

| | | |
|---|---|---|
| 2,523,479 | O'Connor | Sept. 26, 1950 |
| 2,590,711 | Krotz | Mar. 25, 1952 |
| 2,889,868 | Seenberg | June 9, 1959 |

FOREIGN PATENTS

| | | |
|---|---|---|
| 218,070 | Australia | Oct. 28, 1958 |